INVENTORS
RUDOLF NÄGELE
ANTAL POÓCZA
By: Nolte & Nolte
ATTORNEYS

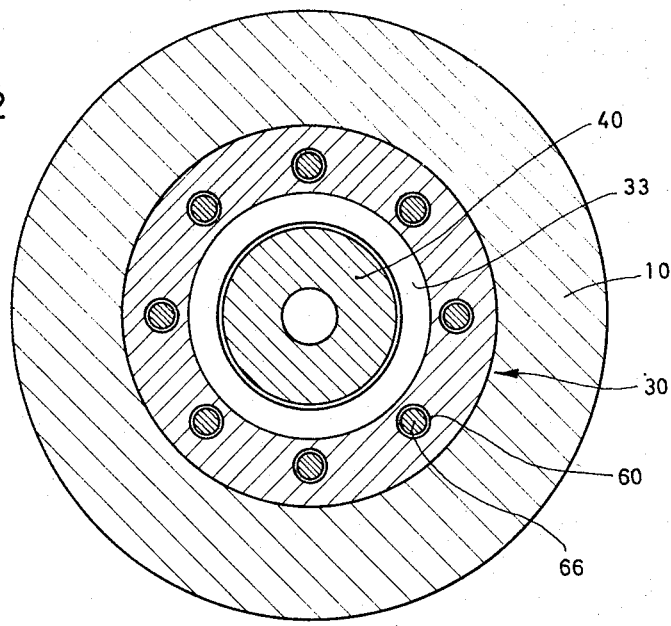
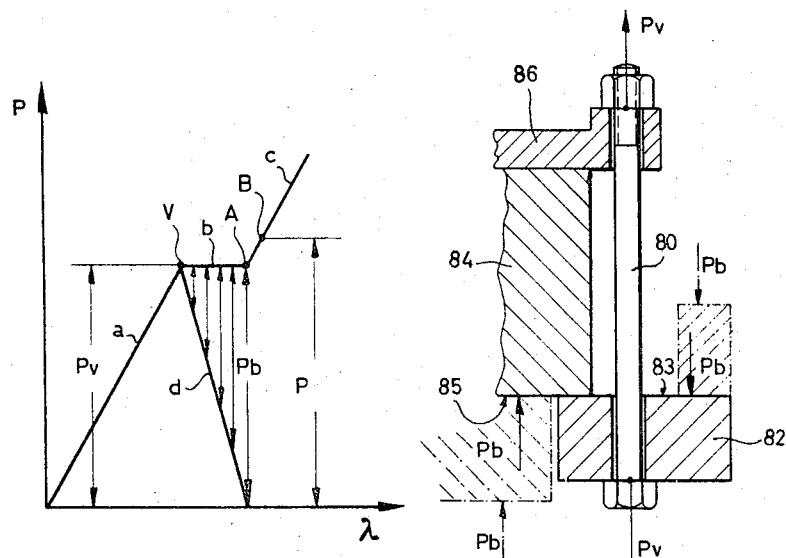
Fig. 2
Fig. 4
Fig. 3

United States Patent Office 3,348,429
Patented Oct. 24, 1967

3,348,429
OVERLOAD SAFETY DEVICE IN MACHINES
Rudolf Nägele, Weissenstein, and Antal Poócza, Strassdorf, Germany, assignors to May-Pressenbau GmbH, Schwabisch Gmund, Germany
Filed July 14, 1965, Ser. No. 471,883
Claims priority, application Germany, Sept. 22, 1964, M 62,521
10 Claims. (Cl. 74—584)

ABSTRACT OF THE DISCLOSURE

A press having an overload safety device in the form of a frangible element which breaks when a given load is exceeded. The press has a drive means and a driven means to which the drive means transmits the driving force through a transmission means which is composed of a train of transmission elements for transmitting the driving force from one of these elements to the other from the drive means to the driven means, and one of the elements in the train of the transmission means is the frangible element which breaks upon occurrence of an overload. The drive means applies to the driven means a force acting in a given direction, and the drive means and driven means directly engage each other in a plane which is perpendicular to the latter direction, this plane being situated at a pair of flat surfaces of the drive means and driven means which engage each other at this plane which is perpendicular to the direction of the driving force. The drive means acts through the transmission means on the driven means to drive the latter in a direction which, when the driven means encounters a load, tends to displace the driven means in reaction to the load in a direction which separates from each other those surfaces of the driving and driven means which engage each other at the latter plane. The transmission means coacts with the driving and driven means for pressing the driving and driven means against each other at the above surfaces thereof which are situated at the latter plane with a given prestress force forming in this way a prestressing of the transmission means so that the frangible element in the train of elements of the transmission means will not break until the prestressing force is exceeded. Since the transmission from the drive means to the driven means goes through the frangible element, in the train of elements of the transmission means, once this frangible element breaks the tranmission is interrupted and the driven means will no longer be driven by the driving means.

---

The invention relates to an overload safety device for machines.

In mechanical presses it is known to employ a presser member, very often a presser plate which breaks after exceeding a maximum of permissible pressing stress, so that the machine itself and expensive machine elements are protected from overloading and breakage.

In a known manner, and in a specific overload safety device, a breakage coupling is installed between the tool support and the point of suspension of the plunger housing. The breakage coupling transmits the periodic stress created by the work piece. A tolerance in the dimensioning of the breakage coupling is not possible in this specific embodiment, because if the breakage coupling is constructed in accordance with the static strength values, it cannot bear the repetitive stress applied; that is, it can break without reaching the permissible presser stress. If the dimensioning of the breakage coupling is constructed in accordance with the endurance strength values, it would be possible to transfer up to two-to-four times the stress to the breakage coupling according to the material used; that is, the machine elements of the press must be constructed for transferring the two-to-four fold stress to the breakage coupling.

Press plates with initially stressed presser members are also known. In this construction, the breakage coupling, when under load, achieves, at a constant initial stress, a periodic stress, the extent of which is defined by the stress, the stiffness of the abutments and the elasticity of the clamping members. For dimensioning the breakage coupling for overload, the elasticity of the clamping members must be exactly calculated. On the other hand, it is essential to define the medium stress and the associated highest stress of the material to bring them in relation with each other, so that the breakage coupling breaks at the slightest overload, whereby a reliable protection for the press and the tools is warranted. Aside from the fact that the breakage coupling is under constant change of stress, with this construction, it is extremely difficult to calculate all these factors exactly, to insure a breakage of the coupling at the desired predetermined stress. In any case, the possibility of material fatigue of the breakage coupling is always present.

It is, therefore, an object of this invention to avoid these disadvantages when employing overload safety devices for machines with a high power demand, for instance, presses, cutters and dies having a working member on which a driving coupling with a driving power is effective at a predetermined overload breaking of a breakage coupling.

According to the invention, the arrangement is such that the working coupling and the driving coupling are pressed together in a predetermined initial stress at their corresponding surfaces lateral to the direction of stress by at least one clamping device, whereby the stress at the separating line or a distance thereof is effective on the corresponding coupling against the direction of the operating drive. The breakage element is arranged between one of the couplings and the clamping device, so that it is under the same initial stress as the working—and the driving coupling. With this arrangement, the clamping device together with its associated breakage coupling is not subject to a change in length and is therefore under no higher stress as the nominal operating power of the effective constant initial stress. When the machine is operating, the breakage coupling is not under periodic stress and is therefore only statically loaded.

In the construction, according to this invention, the operating power is effective at the separating line of both couplings, whereby the couplings can only be separated from each other when the operating power becomes larger than the initial stress. If the operating power is smaller, only a reduction of the face pressure in the separating line occurs. The stress of the clamping device and of the couplings remain unchanged, that is, the clamping device acts as though it is completely elastic and the couplings as if they are completely rigid.

In accordance with the invention, the initial stress of the overload safety device will be advantageously selected in concurrence with the permissible stress. When the permissible stress is exceeded, the total overload is effective on the breakage coupling in addition to the initial stress, whereby the breakage coupling has to be constructed in such a manner that it breaks at a defined overload. The dimensioning of all parts is therefore especially simple and can be calculated correctly, since, as already mentioned, only a mere static problem is to be dealt with.

According to the invention, and in the practical construction thereof, the working coupling may comprise a lateral shoulder arranged in working direction against which a transmission piece engages, having a lateral shoulder arranged against the working direction and pressed by the clamping device. According to a preferred embodiment of the invention, if the working coupling is arranged within the drive coupling, the working coupling comprises an outer lateral shoulder and the transmission piece comprises an inner lateral shoulder.

In the above-mentioned construction in which the working coupling is arranged within drive coupling, a number of parts may be annular in shape. In one construction, according to the invention, the transmission piece is arranged in the form of an annular piece, and the lateral shoulders are provided in the form of annular shoulders.

The transmission piece or the annular piece is preferably rigidly connected with the drive coupling, and is arranged to constitute a part separate from the working coupling, but is rigidly and removably connected with the working coupling by means of a retaining device. For this purpose, the transmission piece, for instance, the annular piece can be supported with its outer shoulder by the working coupling and be retained by a removable annular flange.

The clamping device can be arranged in any given form, as long as the corresponding parts are clamped together with an initial stress and as long as it is adapted to transfer the working power. It is advantageous to employ clamping bolts which, during tightening of the screws, exert the necessary initial stress, whereby the clamping screw bolts penetrate into openings of the transmission piece and the breakage element, leaving a tolerance, so that no additional friction exists.

According to the invention, the breakage element may be mounted on the working coupling, if the working coupling is centrally arranged, whereby the clamping screw bolts are preferably effective over an abutment ring onto the annular marginal portion of the breakage element.

The working coupling itself can be divided into several parts and can be provided with a special pressure piece on which the lateral shoulder is mounted, whereby this pressure member is rigidly connected with other parts, for instance, a transmission piece and a tool support. With a construction according to the invention, it is especially advantageous, if the transmission piece, the pressure piece of the working coupling, the breakage element and the clamping device, which keeps all parts together, form one construction element, which could be separately constructed and installed into the machine as an integral member.

The various features of novelty which characterize the invention are pointed out with particularity in the claims annexed to and forming a part of this specification. For a better understanding of the invention, its operating advantages and the specific objects attained by its use, reference should be had to the accompanying drawings and descriptive matter in which:

FIG. 2 is a cross section taken along line 2—2 of FIG. 1;

FIG. 3 is a sectional detailed view showing the parts in the overload safety device also showing, in vector form, the stresses extended on these parts; and FIG. 4 is a graphical illustration of the deformation of the parts when stress is applied.

Figure 1:
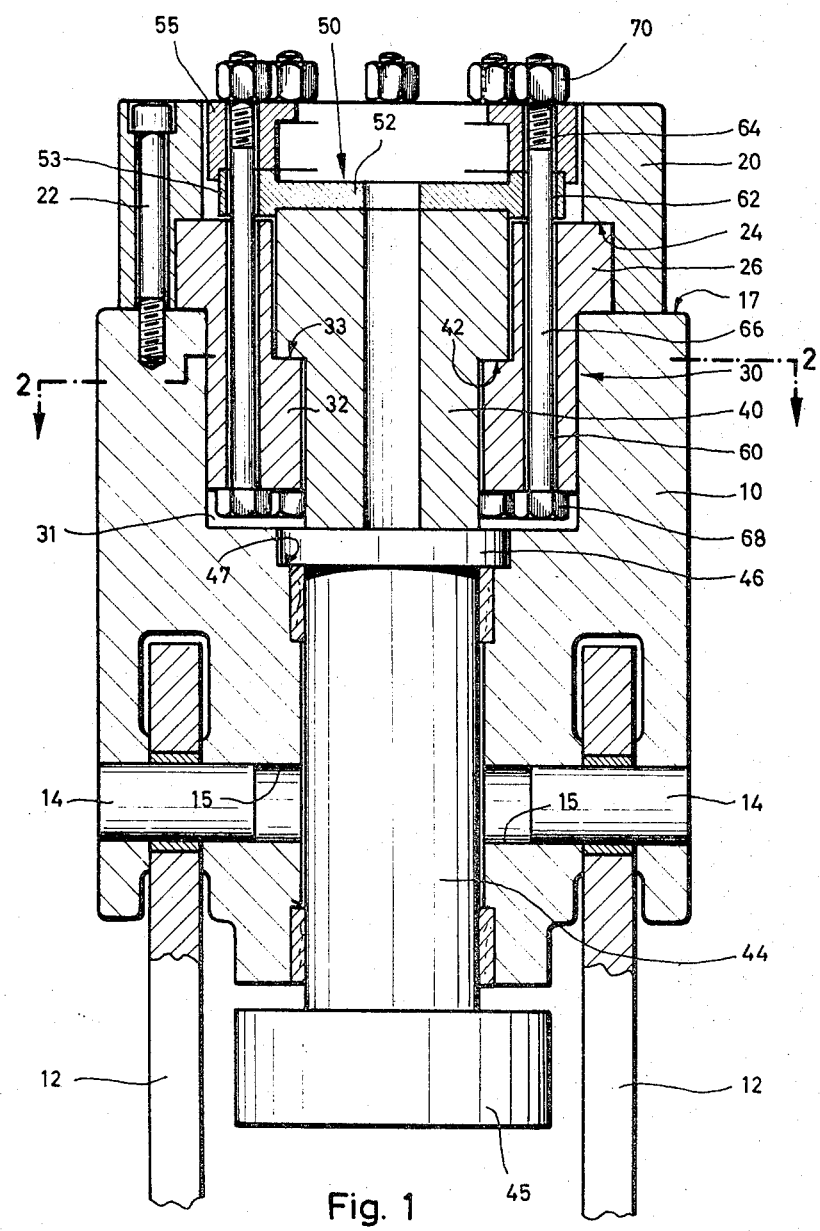
FIG. 1 is an axial section of an overload safety device according to the invention.

In the embodiment of an overload safety device shown in FIGS. 1 and 2, and outside plunger is arranged as a drive member having an annular form and is generally designated 10. For driving the outside plunger 10, driving arms 12 engage the outside plunger 10 in recesses. The arms are retained in these recesses by means of joint bolts 14 received in bores 15 provided in the outside plunger. The arms 12 may be driven in any suitable way and may be parts of a toggle joint system or of a crank drive, in order to move the plunger in a straight line. Since these drives are known and do not form a part of this invention they will not be described in detail.

As can be seen from the drawings, a flange ring 20 is mounted on the upper surface 17 of the outside plunger. The flange ring is fixedly, but removably connected with outside plunger 10 by means of retaining screws 22. According to FIG. 1, flange ring 20 comprises a downwardly directed inner shoulder 24 and engages, between this inner shoulder and the upwardly directed surface 17 of the outside plunger 10, with an outside collar 26 of an annular piece 30 which extends into a cylindrical recess 31 of outside plunger 10. Opposite to the outside collar 26, the annular piece 30 comprises an inner collar 32 having an inner annular shoulder 33.

A pressure piece, generally designated 40, engages inner annular shoulder 33 with an outer annular shoulder 42. Rigidly connected with this pressure piece 40 is a transmission piece or tool-carrying means 44 and a tool support 45. An annular collar 46 is provided in a corresponding recess of the outside plunger 10 and is mounted on a shoulder 47 thereof.

As can be seen in FIG. 1, a breakage element 50 is arranged above the pressure piece 40, is supported with its associated breakage plate 52 on the upper surface of the pressure piece, and has an outer annular collar 53. Arranged on this outer annular collar is an abutment ring 55.

The above named parts, namely, pressure piece 40, annular piece 30 and breakage element 50 are joined by retaining screws which extend with their associated shafts 66 through holes 60 of the annular piece, holes 62 of the breakage element, holes 64 of the abutment ring and engage with their associated heads 68 against annular piece 30. The free ends of these retaining screws are provided with nuts 70.

FIG. 3 shows a clamping device 80, a drive coupling 82, a working coupling 84 and a breakage element 86. The initial stress created by the clamping device is shown by arrows $Pv$ and the stress during the operation of the machine is shown by the arrows $Pb$, so that faces 83 and 85 which form the separating line are pressed against each other.

FIG. 4 shows, in graphical form, the deformation of the initial stress screw while under operating stress. Assuming that normally the deformation to the yield point is proportional to the stress, a straight line $a$ is formed, which extends from a zero point to a V point, whereby the height of point V corresponds to the initial stress $Pv$. In inoperative position these parts are subject to the initial stress $Pv$.

When a pressure $Pb$ is exerted onto the working coupling, the initial stress $Pv$ remains constant. In FIG. 4 these stresses $Pb$ are indicated between the horizontal line $b$ and line $d$. In this case the horizontal line indicates that the initial stress remains unchanged to point A of the end of line $b$. At this point of line $b$, the working pressure $Pb$ corresponds to the initial stress $Pv$.

In this position both faces 83 and 85 are separated, whereby an additional stress is transferred to the clamping device from point A along line $c$ and is thereby transmitted to the breakage element 86, so that after reaching point B and breakage load P, the breakage element 86 breaks and actuates the overload safety device.

The forces $Pb$ must not necessarily be effective in the separating lines. The same favorable condition exists when forces $Pb$ are effective against the driving direction, away from the separating line. This type of force is indicated by dotted lines in FIG. 3.

It is apparent from the above description that the drive member or plunger 10, which corresponds to drive coupling 82 of FIG. 3, forms together with the ring 20 and the annular piece 30, which is removably fixed to the member 10 by way of the screws 22, a drive means for driving a driven means which is formed by the pressure piece 40, which corresponds to the working coupling 84 of FIG. 3. The drive means and driven means are interconnected by a transmission means which is formed by the retaining bolts 66, the abutment ring 55, and the frangible breakage element 50. Thus, the transmission means includes a train of transmission elements which transmit the drive from the drive means to the driven means from one element of the train to the next, and the bolts 66 form the first element of the train of transmission elements transmitting the drive from the annular piece 30 of the drive means to the abutment ring 55 of the transmission means which in turn transmits the drive to the frangible element 50 of the transmission means, the latter element directly engaging the driven means 40, so that the frangible element 50 is situated directly in the train of elements of the transmission means to interrupt the transmission of the driving force from the drive means to the driven means when the frangible element 50 breaks. The drive means has a flat surface 33 which engages a flat surface 42 of the driven means, and these surfaces are pressed against each other in accordance with the prestressing force derived by way of the bolts 66 and the nuts 70, the surfaces 33 and 42 of the drive means and driven means, respectively, engaging each other in a plane which is normal or perpendicular to the direction of the driving force transmitted from the drive means to the driven means. The surface 85 of FIG. 3 corresponds to the surface 42 of FIG. 1, the surface 83 of FIG. 3 corresponds to the surface 33 of FIG. 1, and frangible element 86 of FIG. 3 corresponds to frangible element 50 of FIG. 1. The load which is encountered by the driven means 40 acts in opposition to the driving force so as to tend to displace the surfaces 33 and 42 away from each other, and of course, this latter force which tends to displace these surfaces away from each other is opposed by frangible element 50 which breaks when this force exceeds the prestressing force. Because the annular piece 30 of the drive means is removably connected at its flange 26 to the remainder of the drive means, by way of the ring 20 and the bolts 22, it is possible to assemble with the prestressed bolts 66 the annular piece 30, the pressure piece 40, and the entire transmission means therebetween, as well as the components 46 and 44 which are connected with the pressure piece 40, so that this latter assembly forms a single unit which can be introduced as a single unit into the assembly shown in FIG. 1, after which the ring 20 is fixed to the plunger 10 by the bolts 22, so as to rigidly fix the annular piece 30 to the remainder of the drive means. It will be noted that the bolts 66 extend with clearance through the aligned bores of the annular piece 30, the rim 53 of the frangible element 50, and the peripheral portion of the abutment ring 55. Moreover, it is clear that this abutment ring 55 engages the frangible element 50 only at its outer peripheral portion 53 which is situated radially beyond the upper surface of the driven means 40 which is directly engaged by the inner plate portion 52 of the frangible element 50 which is surrounded by the rim 53 thereof.

The above described overload safety device has been described in detail in accordance with compression stress. The device can also be employed in the same advantageous manner where pulling tension is applied.

This invention should not be limited to the specific embodiment shown by the appended drawings, but rather should be defined by the scope of the appended claims.

What is claimed is:

1. In a press, drive means for providing a force which extends in a given direction, driven means driven by said drive means in said direction, said drive means and driven means respectively having flat surfaces which directly engage each other in a plane which is perpendicular to said force, and transmission means coacting with said drive means and driven means for transmitting a drive from said drive means to said driven means while pressing said drive means and driven means against each other at said surfaces thereof with a given prestress force, said transmission means including a train of transmission elements which transmit the drive from one element to the next element from said drive means to said driven means, and one of said elements of said transmission means being frangible and capable of breaking at a given force which exceeds said prestress force by a given increment so as to interrupt the transmission of the drive from said drive means to said driven means, and said prestress force with which said transmission means presses aid drive mean and driven means against each other at said surfaces thereof being opposed by said driven means when the latter encounters a load so that when said driven means encounters a load said surfaces tend to be displaced apart from each other in opposition to the prestress force provided by said transmission means.

2. The combination of claim 1 and wherein said driven means has an exterior annular shoulder forming said surface thereof and said drive means including also an annular shoulder forming said surface of said drive means and engaging said annular shoulder of said driven means.

3. The combination of claim 2 and wherein said drive means includes an annular piece surrounding said driven means and having an inner shoulder which forms said surface of said drive means.

4. The combination of claim 3 and wherein said annular piece of said drive means is removably fixed with the remainder of said drive means.

5. The combination of claim 4 and wherein said annular piece has an outer flange, said drive means including a drive member engaging said flange of said annular piece and a fixing ring also engaging said flange and fixed to said drive member for rigidly fixing said annular piece with the remainder of said drive means.

6. The combination of claim 1 and wherein said transmission means includes a plurality of bolts which are tensioned to provide said prestress force, said bolts forming one of the series of elements of said transmission means.

7. The combination of claim 6 and wherein said drive means is formed with a plurality of openings through which said bolts extend with clearance and said frangible element of said transmission means also being formed with openings through which said bolts extend with clearance.

8. The combination of claim 7 and wherein said frangible element has a central plate portion and an outer peripheral portion surrounding said central plate portion thereof, said driven means having an end face engaged only by said central plate portion of said frangible element, so that said peripheral portion thereof is situated radially beyond said driven means, and said train of elements of said transmission means including an abutment ring engaging said peripheral portion of said frangible element and acted upon by said bolts to urge said frangible element against said driven means and the latter against said surface of said drive means.

9. The combination of claim 1 and wherein said driven means is in the form of a pressure piece having an exterior shoulder forming said surface of said driven means and a tool-carrying means operatively connected with said pressure piece to be actuated thereby.

10. The combination of claim 1 and wherein said drive means includes an annular piece directly connected with said transmission means and removably fixed to the remainder of said drive means, said annular piece surrounding said driven means and forming with the latter and said transmission means a unit which can be connected with said drive means.

References Cited
UNITED STATES PATENTS

| | | | |
|---|---|---|---|
| 1,847,620 | 3/1922 | Miller | 74—584 |
| 2,616,543 | 11/1952 | Danly | 100—53 |
| 3,131,554 | 5/1964 | Hornschuch | 173—93 |

FRED C. MATTERN, JR., *Primary Examiner.*

W. S. RATLIFF, *Assistant Examiner.*